EXAMINER
BEST AVAILABLE COPY
Fox & Fink
Car Ventilator,
No. 235. A. I. May 10, 1859.
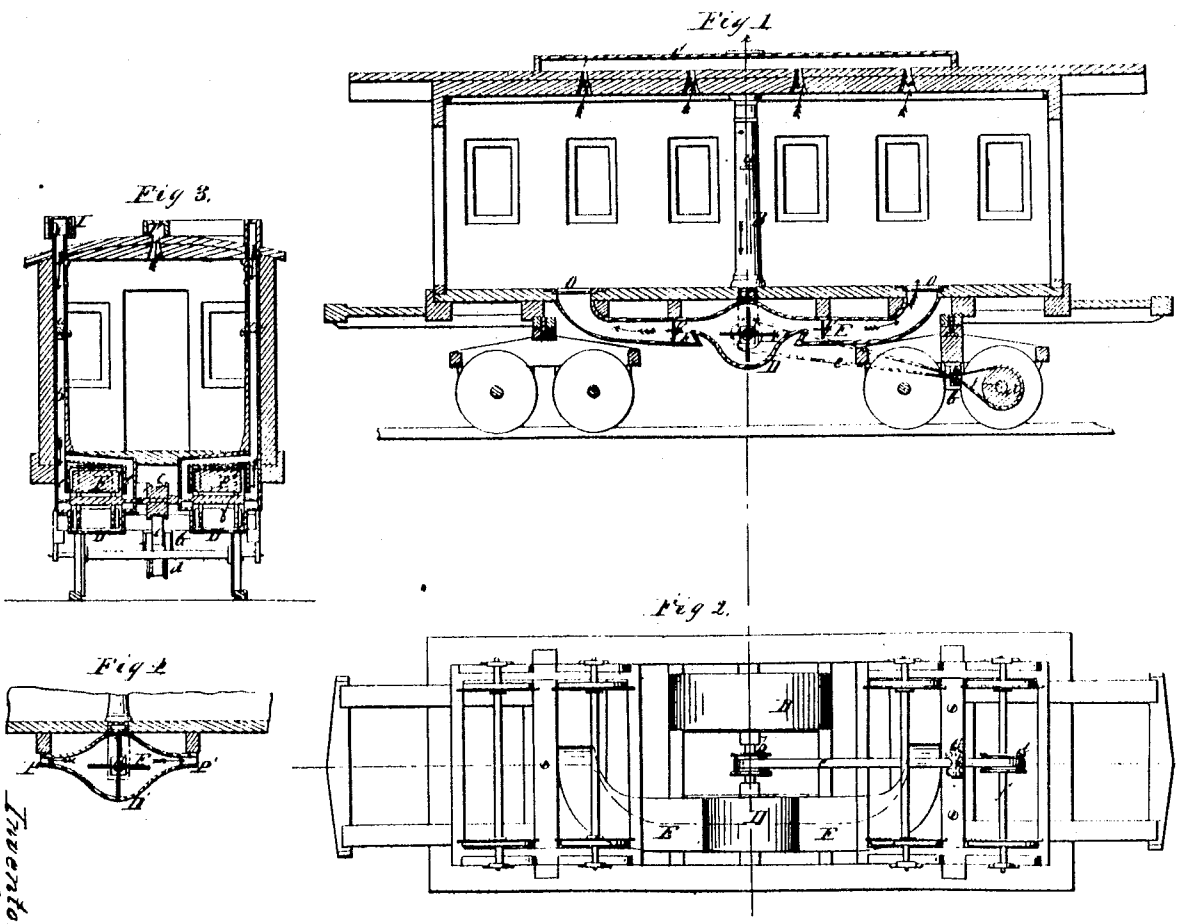
Witnesses,
Geo Patten
Jas Tolley
Inventors
D. H. Fox
John Fink
H. PETERS, PHOTO-LITHOGRAPHER, WASHINGTON, D. C.